United States Patent [19]
Stern et al.

[11] 3,920,758
[45] Nov. 18, 1975

[54] PREPARATION OF PERFUMERY MATERIAL POSSESSING A SANDALWOOD-LIKE ODOR

[75] Inventors: Alfred Stern, Englewood; Morris Dunkel, Paramus, both of N.J.

[73] Assignee: Universal Oil Products Company, Des Plaines, Ill.

[22] Filed: Jan. 10, 1972

[21] Appl. No.: 216,786

Related U.S. Application Data

[63] Continuation of Ser. No. 770,056, Oct. 23, 1968, abandoned.

[52] U.S. Cl............. 260/631 H; 252/522; 260/619 R
[51] Int. Cl.²......................................... C07C 35/21
[58] Field of Search.................... 260/631 H, 619 D

[56] References Cited
UNITED STATES PATENTS

| | | | |
|---|---|---|---|
| 3,014,079 | 2/1958 | Olin | 260/624 |
| 3,278,611 | 10/1966 | Dewhurst | 260/631 |

FOREIGN PATENTS OR APPLICATIONS

| | | | |
|---|---|---|---|
| 1,355,165 | 3/1964 | France | 260/619 D |
| 461,957 | 2/1937 | United Kingdom | 260/631 H |

OTHER PUBLICATIONS

Olah, "Friedel Crafts and Related Reactions," pp. 201–204, Interscience, (1963), N.Y., N.Y.

*Primary Examiner*—Donald G. Daus
*Assistant Examiner*—D. B. Springer
*Attorney, Agent, or Firm*—James R. Hoatson, Jr.; Bernard L. Kramer

[57] ABSTRACT

Preparation of m-$C_{10}$-terpinylcyclohexanols by subjecting a predominately p-isobornylphenol-containing mixture to equilibration to form the corresponding phenols containing a high meta isomer content and thereafter catalytically hydrogenating to prepare the corresponding $C_{10}$ cyclohexanols. It also includes effecting the alkylation of phenol with camphene and equilibration of the resultant product in the same system. This material is useful as a perfumery material having a sandalwood-like odor.

2 Claims, No Drawings

PREPARATION OF PERFUMERY MATERIAL POSSESSING A SANDALWOOD-LIKE ODOR

This is a continuation of application Ser. No. 770,056, filed Oct. 23, 1968, now abandoned.

BACKGROUND OF THE INVENTION

The preparation of an aroma material having a sandalwood-like odor has heretofore comprised the catalytic hydrogenation of isobornylguaiacol to isobornylcyclohexanol. This reaction is sluggish and is accompanied by incomplete hydrogenation and also by the formation of undesired compounds having a ketonic structure. Considerable research is being conducted to improve the reaction by the use of various catalysts and/or different solvents. However, this approach to the problem has met with only moderate success.

DESCRIPTION OF THE INVENTION

In contrast to the above, the present applicants have discovered an entirely new approach to the manufacture of m-$C_{10}$-terpinylcyclohexanols having the desired sandalwood-like odor. As set forth in the above abstract, this new approach utilizes isobornylphenol instead of isobornylguaiacol as the charge to the hydrogenation reaction. The isobornylphenol is formed by the reaction of phenol with camphene, for example, and this forms predominately the para-isomer. In accordance with the present invention the predominately para-isomer is subjected to equilibration in the presence of a Friedel-Crafts catalyst to form the corresponding predominately m-isomer, which then is the charge to the hydrogenation step of the process.

In one embodiment, the present invention relates to a process for preparing m-$C_{10}$-terpinylcyclohexanols which comprises subjecting a mixture predominating in p-isobornylphenol to equilibration in the presence of a Friedel-Crafts catalyst to form the corresponding phenols containing a high meta-isomer content, thereafter hydrogenating the same with hydrogen in contact with a hydrogenation catalyst, and recovering the corresponding $C_{10}$-terpinylcyclohexanols.

In another embodiment of the invention, the mixture containing p-isobornylphenol is formed by the alkylation of phenol with camphene in the presence of a Friedel-Crafts catalyst and equilibration of the same to a mixture predominating in the corresponding meta-isomer is effected in the presence of the Friedel-Crafts catalyst. In this embodiment, the alkylation and equilibration is effected in the same system.

In the one step system referred to in the previous paragraph, phenol and camphene are reacted in the presence of a Friedel-Crafts catalyst. While the invention is particularly applicable to the preparation of isobornylphenol by the reaction of phenol and camphene, it is understood that other suitable compounds may be reacted with phenol. These other compounds include, for example, bornylene and various other terpenic isomers. It is understood that the different terpenic compounds are not necessarily equivalent.

As hereinbefore set forth, camphene or other terpenic compounds are reacted with phenol. As hereinbefore set forth, the use of guaiacol in this reaction results in a product which is difficult to hydrogenate to the desired isobornylcyclohexanol. The present applicant believe that the difficulty encountered in the hydrogenation are due to the hydrogenolysis of the methoxy group in guaiacol. It is understood that the phenol may contain unreactive groups, such as alkyl and particularly methyl, ethyl, propyl and/or butyl attached to the nucleus. However, here again, the use of differently substituted phenols is not necessarily equivalent.

The alkylation of phenol with camphene is effected in the presence of a Friedel-Crafts catalyst. Aluminum chloride is particularly preferred. Other Friedel-Crafts catalysts include ferric chloride, stannic chloride, zinc chloride, etc. The reaction generally is effected at a temperature of from about 50° to about 100°C. For ease of operation and handling, the reactants preferably are dissolved in a suitable solvent as, for example, ethylene dichloride. In one method, the phenol, catalyst and solvent are charged to a suitable reaction zone and camphene dissolved in the solvent is slowly added thereto. The reaction mixture is intimately stirred. The reaction is exothermic and causes a rise in temperature as, for example, by being commingled at room temperature and the temperature rising to about 60°–65°C. The time of reaction will be sufficient to effect the desired purpose and may range from 0.25 to 5 hours or more. Equal mole proportions of phenol and camphene are required but generally an excess of phenol is used and may range from 1.5 to 3 or more mole proportions of phenol per one mole proportion of camphene.

As hereinbefore set forth, the reaction product is subject to equilibration to form the corresponding predominately m-isomers. While this may be effected in a different system, another advantage to the process of the present invention is that the equilibration is accomplished in the same system by mixing and heating the reaction mixture to a temperature from about 100° to about 150°C. Here again, the heating and mixing will be continued for a time sufficient to effect the desired equilibration and may range from 2 to 24 hours or more.

In another method, the alkylation of phenol with camphene is effected externally, using any suitable process therefor. For example, the alkylation of phenol with camphene may be effected using a catalyst such as polyphosphoric acid, activated aluminum silicate, etc.

Regardless of the method of preparing the isobornylphenol, the product is subjected to equilibration in contact with a Friedel-Crafts catalyst as hereinbefore described. Following the equilibration, the product is recovered in any suitable manner including, for example, one or more of washing with water, hydrocarbon or alkaline solvent, stripping, vacuum distillation, drying over magnesium sulfate or the like, etc.

The equilibrated substituted phenol product is subjected to hydrogen in contact with a suitable catalyst. A particularly preferred catalyst comprises rhodium composited with carbon. The catalyst may contain from 1% and preferably from 3% to 10% or more of rhodium. Other suitable hydrogenation catalysts include Raney nickel, Raney cobalt, platinum, palladium, etc., which may be composited with a suitable support including carbon, alumina, etc. The hydrogenation is effected at any suitable temperature and generally will be within the range of from about 125° to about 300°C., utilizing a hydrogen pressure of from about 100 to 1,000 pounds or more per square inch. The time of hydrogenation will be sufficient to effect the desired reaction and may range from 2 to 24 hours or more. After completion of the hydrogenation, the reaction products are recovered in any suitable manner. When this reaction is effected in a batch operation, the reactor effluent is filtered to remove catalyst and the filtrate then is processed in any suitable manner, including vacuum distillation to recover the desired $C_{10}$-terpinylcyclohexanols possessing a sandalwood-like odor.

The alkylation and/or equilibration reactions preferably are effected in a batch type operation, in which the reactants are charged to a reaction vessel provided with suitable mixing and heating means. While a batch type operation is preferred, it is understood that a continuous type system may be used, preferably provided with sufficient recycle of unconverted charge to effect further utilization thereof. The hydrogenation step of the system may be batch type or may be of the continuous type in which the charge and hydrogen, at the desired temperature and pressure, are passed into a reaction zone containing a solid bed of the catalyst disposed therein. Following completion of the reaction, the reactor effluent is further processed in the manner hereinbefore set forth.

As hereinbefore set forth, the products of the hydrogenation possess a sandalwood-like odor and thus are particularly useful as an aroma material. These may be compounded with other aroma chemicals and solvents to form a perfume composition having a sandalwood note.

The following examples are introduced to illustrate further the novelty and utility of the present invention but not with the intention of unduly limiting the same.

EXAMPLE I

In this example p-isobornylphenol was prepared by slowly adding, over a period of 0.5 hour, 508 g. (3.6 moles) of camphene dissolved in 200 ml. of heptane to 880 g. (8.96 moles) of phenol dissolved in 644 g. of polyphosphoric acid and 600 ml. of heptane, with stirring at room temperature. The mixture was stirred overnight at room temperature, after which the polyphosphoric acid layer was separated. The remaining heptane solution was washed with 10% sodium carbonate and then stripped free of solvent under vacuum. The remaining oil gave a 75% yield of product, having a boiling range of from 143°–160°C. at 1 mm. Analysis by GLC indicated a high degree of purity.

The p-isobornylphenol was subjected to equilibration by mixing 229 g. (1 mole) of the p-isobornylphenol, prepared as described above, 94 g. (1.5 moles) of phenol and 26.7 g. (0.2 moles) of aluminum chloride. The mixture was heated to 120°C., with continued stirring, and kept at this temperature for 10.5 hours. The reaction mixture then was poured onto ice and washed with 10% sodium bicarbonate. After separation, the organic layer was dried over magnesium sulfate. The dried material was vacuum distilled at 4–5 mm. in a short unpacked column and yielded 128.2 g. (56% yield) of a viscous liquid having a boiling range of 145°–168°C.

The equilibrated isobornylphenol, prepared in the above manner, was subjected to hydrogenation by charging into an autoclave 126 g. of the equilibrated isobornylphenol and 5 g. of 5% rhodium on carbon catalyst. The autoclave was a 300 ml. stainless steel stirred autoclave. The autoclave was then charged with hydrogen and heated rapidly to 152°C. to a hydrogen pressure of 1,000 psig. A total of 1,270 pounds of hydrogen was consumed in 6.5 hours, which corresponds to a theoretical hydrogen consumption of 1,295 psig. After completion of the hydrogenation, the reaction mixture was removed from the autoclave and filtered. The clear filtrate was then vacuum distilled through a Vigreaux column at reduced pressure. After removal of a small amount of volatile material, a heart cut of colorless viscous liquid was collected. This liquid had a boiling range of 146°–160°C. at 5 mm. pressure. The product assayed 87% alcohol and contained no ketonic material when analyzed by infra-red. The product had a strong sandalwood-like odor.

EXAMPLE II

This example describes the alkylation and equilibration in the same system. This was effected by forming a mixture of 220 g. (2.2 moles) of phenol and 24 g. (0.18 moles) of aluminum chloride contained in 220 ml. of ethylene dichloride, to which was slowly added a mixture of 127 g. (0.9 moles) of camphene dissolved in 50 ml. of ethylene dichloride, over a period of 0.5 hour. The slow addition caused the reaction mixture to warm up from room temperature to 63°C. The reaction mixture was brought to reflux (100°C.) and held there for 11.5 hours. The reaction mixture was then quenched into an ice-water slurry. The aqueous phase was separated and the remaining oil phase was washed with 10% aqueous sodium carbonate.

After completion of the washing, and suitable drying, the organic phase was stripped free of solvent. The remaining oil was fractionally distilled under vacuum of about 2 mm. through a Vigreaux column. After distilling over 96.3 g. of phenol, 112.1 g. (55% yield) of a viscous water white liquid having a boiling range of 137–155°C. was obtained.

The equilibrated isobornylphenol prepared in the above manner was subjected to hydrogenation by charging 112 g. thereof and 3.6 g. of 5% rhodium on carbon catalyst to a 300 ml. stainless steel stirred autoclave. The temperature was raised to 160°C. at a hydrogen pressure of 850 psig. There was consumed 1,080 pounds of hydrogen in a period of 2 hours, which corresponds to the theoretical hydrogen consumption of 1,130 pounds. Following completion of the hydrogenation, the autoclave contents were removed, filtered free of catalyst, and vacuum distilled at 2 mm. pressure through a Vigreaux column. The main fraction distilled at 136°–140°C. and was recovered as the m-$C_{10}$-terpinylcyclohexanol product having a sandalwood-like odor.

EXAMPLE III

In contrast to the high yields of ketonic free product prepared in accordance with Examples I and II, hydrogenation of isobornylguaiacol in the presence of 5% rhodium-carbon catalyst at 152°C. for 9 hours resulted in hydrogen consumption of only 55% of theoretical. Other runs made using various solvents and different catalysts also showed incomplete hydrogenation and/or ketonic compounds in the product.

We claim as our invention:

1. A process for preparing m-$C_{10}$-terpinylcyclohexanols possessing a sandalwood-like odor in which a mixture predominating in p-isobornylphenol is equilibrated in the presence of an aluminum chloride catalyst at a temperature of about 100° to about 150°C. and a time of from about 2 to about 24 hours to form the corresponding meta-isomer, thereafter hydrogenating the same with hydrogen in contact with a hydrogenation catalyst, and recovering the resultant corresponding $C_{10}$-terpinylcyclohexanols.

2. The process of claim 1 in which the hydrogenation is effected in contact with rhodium-carbon catalyst at a temperature of from about 125° to about 300°C.

* * * * *